United States Patent [19]
Nyunoya

[11] 4,068,901
[45] Jan. 17, 1978

[54] BRAKE PRESSURE DIFFERENCE WARNING SYSTEM FOR VEHICLES

[75] Inventor: Mizuo Nyunoya, Toyota, Japan

[73] Assignee: Aisin Seiki Kabushiki Kaisha, Japan

[21] Appl. No.: 726,229

[22] Filed: Sept. 24, 1976

Related U.S. Application Data

[63] Continuation of Ser. No. 587,050, June 16, 1975, abandoned.

[30] Foreign Application Priority Data

June 26, 1974   Japan .................................. 49-73528

[51] Int. Cl.² ............................................. B60T 8/26
[52] U.S. Cl. .................................... 303/6 C; 188/349
[58] Field of Search ........................ 303/6 C, 6 R, 84; 188/349, 151 A; 200/82 D; 340/52 C; 60/591

[56] References Cited

U.S. PATENT DOCUMENTS

| | | | |
|---|---|---|---|
| 3,450,443 | 6/1969 | Bueler | 303/6 C |
| 3,464,741 | 9/1969 | Falk | 303/6 C |
| 3,680,921 | 8/1972 | Falk | 188/349 X |
| 3,708,211 | 1/1973 | Bueler | 303/6 C |

Primary Examiner—Trygve M. Blix
Assistant Examiner—Douglas C. Butler
Attorney, Agent, or Firm—Oblon, Fisher, Spivak, McClelland & Maier

[57] ABSTRACT

A brake pressure-failure warning system for use with a split or dual type brake system having two brake lines includes a stepped piston operatively associated with an electrical warning switch and supplied with brake pressure from both of the brake lines, a proportioning valve disposed within the rear wheel brake line, and three fluid chambers, two of which are usually in fluid communication through the proportioning valve and a passage. When either one of the three fluid chambers is subjected to a hydraulic failure, the two chambers are in direct fluidic communication without fluid passing through the proportioning valve, the passage in effect being utilized as a by-pass passage under such hydraulic failure conditions.

10 Claims, 3 Drawing Figures

BRAKE PRESSURE DIFFERENCE WARNING SYSTEM FOR VEHICLES

This is a continuation, of application Ser. No. 587,050, filed June 16, 1975, now abandoned.

BACKGROUND OF THE INVENTION

1. Field of the Invention

The present invention relates generally to a fluid pressure failure warning system for vehicle brakes, and more particularly to a brake pressure difference warning system utilized within a split-type brake assembly and operatively associated with a proportioning valve assembly for automobiles so as to cooperate with such valve assembly.

2. Description of the Prior Art

Within split or dual-type braking systems having at least two independent brake lines for providing fluid pressure to the brakes, the front and rear wheel brakes are usually applied independently of each other. When a hydraulic failure occurs within one of the brake lines, the vehicle driver should be notified of it, and many warning system have been proposed in order to give such notice of a fluid pressure failure to the driver.

It is also a conventional practice to incorporate a proportioning valve into the rear wheel brake line so as to thereby apply a proportioning brake pressure to the rear wheel brakes. The proportioning valve may sometimes be ineffective and more specifically, the reciprocable piston of the proportioning valve may be undesirably maintained seated upon its valve seat thereof whereby brake pressure is unable to be applied to the rear wheel brakes.

Under such conditions, it is desirable to give notice of such failure of the proportioning valve to the driver. In addition, it is desirable to compensate the pressure decrease of the rear wheel brakes, such pressure decrease being due to the interruption of the fluid supply as a result of the continuous seating of the reciprocable piston upon its valve seat.

Applicant has provided an improved fluid pressure failure warning system which overcomes the aforenoted disadvantages of the prior art, as disclosed within applicant's co-pending application BRAKE PRESSURE DIFFERENCE WARNING SYSTEM FOR VEHICLES, Ser. No. 587,057, filed June 16, 1975, now abandoned and the present application is an improvement upon such aforenoted invention.

SUMMARY OF THE INVENTION

Accordingly, it is an object of the present invention to provide a brake pressure difference warning system wherein a failure of the proportioning valve is indicated to the vehicle driver and the resulting decrease in brake pressure due to such failure is compensated.

Another object of the present invention is to provide a brake pressure difference warning system wherein when either one of the brake lines is subjected to a failure, the operation of the proportioning valve is rendered ineffective by by-passing the brake fluid pressure therearound so that the brake pressure decrease is compensated.

A further object of the present invention is to provide a brake pressure difference warning system wherein the by-pass passage is incorporated within the system housing, as opposed to having the same incorporated within a separate line or conduit externally thereof, and wherein further, such passage is utilized both under normal and failure by-pass conditions.

A still further object of the present invention is to provide a brake pressure difference warning system which is automatically adjusted solely by applying the fluid pressure subsequent to the repair of the hydraulic failure.

A still yet further object of the present invention is to provide a brake pressure difference warning system which is simple and extremely compact in construction.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE ILLUSTRATED EMBODIMENTS

Figure 1:
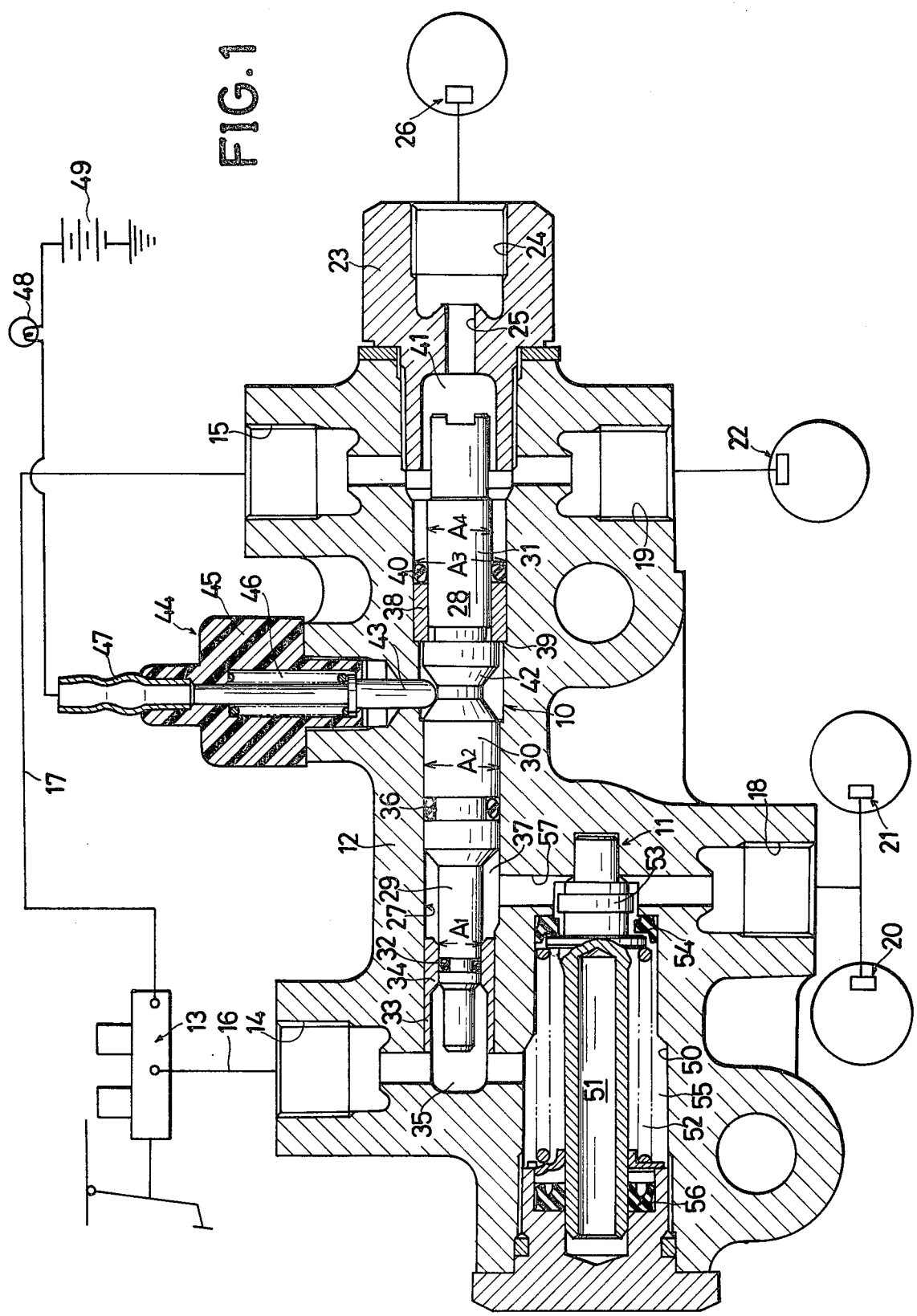
FIG. 1 is a schematic, cross-sectional view of one embodiment of a brake pressure-difference warning system constructed in accordance with the present invention and showing its cooperative parts.

Referring now to the drawings and more particularly to FIG. 1 thereof, a first embodiment of the present invention is illustrated as including a pressuredifference warning assembly, generally indicated by the reference character 10 and a proportioning valve assembly, generally indicated by the reference character 11, both of which are incorporated within a common housing 12. A split-type master brake cylinder 13 is fluidically connected to inlet ports 14 and 15 of the housing 12 through means of conduits 16 and 17, respectively, and the housing 12 is also provided with outlet ports 18 and 19. The outlet port 18 is fluidically connected to a set of rear wheel brakes 20 and 21 while the outlet port 19 is fluidically connected to one of the front wheel brakes 22. A plug 23 is threadedly secured within housing 12, and is provided with an outlet port 24 which is normally fluidically connected to the inlet port 15 through means of an axial passage 25 and to the other front wheel brake 26.

The housing 12 includes a stepped axial bore 27 having two diametrical sections $A_2$ and $A_3$ and within which a stepped piston 28 of the warning assembly 10 is slidably disposed. The piston 28 comprises a left end portion 29, having a diameter $A_1$, a central portion 30, having a diameter $A_2$, and a right end portion 31, having a diameter $A_4$. The relationship of the diameters $A_1 - A_4$ is as follows:

$$A_3 > A_2 > A_4 > A_1$$

An annular seal ring 32 is mounted upon the left end portion 29 of piston 28 so as to engage a sleeve 33 fixed within the bore 27 of housing 12, and the sleeve 33 is seen to include an annular, radially inward projection 34 which slidably receives the left end portion 29 of piston 28 and the seal ring 32 therethrough. Thus, a first fluid chamber 35, normally fluidically connected to inlet port 14, is defined within the left end of bore 2.

A seal ring 36 is similarly mounted upon the central portion 30 of piston 28 so as to engage the bore 27, and consequently, a second, annular fluid chamber 37 is defined between the seal rings 32 and 36. An annular sleeve 38 is slidably mounted upon the right end portion 31 of piston 28 and the same is adapted to abut an interior shoulder 39 of housing 12, while an annular seal ring 40 is similarly disposed upon the right end portion 31 of piston 28 so as to engage the large diameter section $A_3$ of bore 27. In this manner, a third fluid chamber 41, normally fluidically connected to the inlet port 15, as well as to the outlet port 24, is defined within the right end portion of the bore 27.

The central portion 30 of piston 28 is also provided with a cam 42 having frusto-conical end portions and a reduced diameter central portion which receives a movable plunger 43 of a switch means 44. An insulative housing 45, made of plastic material, is fixed upon housing 12 so as to thereby receive the plunger 43 therein, the latter of which is normally biased to move downwardly by means of a spring 46. A metallic tube 47 is fixed within the upper portion of insulative housing 45 and is electrically connected to a warning lamp 48 as well as to a grounded electrical power source 49.

The housing 12 includes another axial bore 50 provided in parallel relationship with the stepped bore 27, and within bore 50 there is slidably disposed a valve piston 51 of the conventional proportioning valve assembly 11. The valve piston 51 is disposed within the illustrated position within bore 50 by means of a coil spring 52 disposed thereabout, whereby an enlarged valve portion 53 is spaced apart or separated from a valve seal seat 54, and a valve chamber 55 is defined between the valve seat 54 and a cup seal 56 disposed within the opposite end of the valve assembly 11.

It should be noted that a radial passage 57 is provided within housing 12 so as to thereby fluidically connect the central fluid chamber 37 to the outlet port 18, and under normal operating conditions of the proportioning valve assembly 11, the radial passage 57 is also fluidically connected to the left fluid chamber 35 through means of assembly 11.

As would be readily apparent to those skilled in the art, the valve piston 51 is moved toward the left when the hydraulic pressure admitted to the valve chamber 55 from the master brake cylinder 13, through means of brake conduit 16, inlet port 14, and the left fluid chamber 35, exceeds a predetermined value. As a result, the enlarged valve portion 53 of valve piston 51 is seated upon the valve seal 54 thereby interrupting fluid communication between the valve chamber 55 and the radial passage 57, and the pressure increase of the rear wheel brakes 20 and 21 is similarly interrupted.

The valve piston 51 is however, immediately moved back toward the right after a further increase in pressure within fluid chamber 55 so as to thereby reestablish fluid communication between chamber 55 and the radial passage 57. Such reciprocable movement of the valve piston 51 is repeated as long as the hydraulic pressure generated within the master brake cylinder 13 is increased. According to such proportioning operation, the hydraulic fluid pressure supplied to the rear wheel brakes 20 and 21 is reduced in comparison with the hydraulic fluid pressure supplied to the front wheel brakes 22 and 26.

In operation of the pressure difference warning assembly 10, when the hydraulic brake pressure of the master brake cylinder 13 is below a predetermined value so that the valve piston 51 is not actuated and no pressure difference exists between the conduits 16 and 17, fluid pressure of the same value is thus admitted into the left fluid chamber 35, the central fluid chamber 37, and the right fluid chamber 41. Accordingly, the piston 28 of the warning assembly 10 is maintained within the illustrated neutral position. More specifically, the hydraulic pressure within the left fluid chamber 35 and acting upon the left end portion 29 of piston 23 of diameter $A_1$ and within the annular central fluid chamber 37 acting upon the annular central portion 30 thereof of diameter $A_2-A_1$ tends to urge the stepped piston 28 to move toward the right, while the hydraulic pressure within the right chamber 41 and acting upon the right end portion 31 thereof and of diameter $A_4$ tends to urge the stepped piston 28 to move toward the left.

If the annular sleeve 38 was not provided, the piston 28 would then in fact be moved toward the right due to the fact that the diameter $A_2$ is larger than the diameter $A_4$. However, as sleeve 38 is provided, the hydraulic pressure within the right chamber 41 acts upon the right end portion 31 and the annular seal ring 40, whereby the presence of annular sleeve 38 counteracts the rightward moving force exerted upon the stepped piston 28 because the diameter $A_3$ is larger than the diameter $A_2$. It is also to be noted that the annular sleeve 38 abuts the inner shoulder 39 of the housing 12, and therefore, the piston 28 is not able to be moved toward the left beyond the illustrated position.

Even after the valve piston 51 of the proportioning valve assembly 11 commences its reciprocating movement whereby the hydraulic pressure within the annular central chamber 37 is less than the hydraulic pressure within the left chamber 35 or within the right chamber 41, the stepped piston 28 may nevertheless be maintained within the illustrated neutral position by appropriately selecting each diameter $A_1-A_4$. Such a selection of the diameters A1 - A4 will be calculated upon the basis of the characteristics of the proportioning valve assembly 11 as well as the maximum brake pressure of master brake cylinder 13. p The operation of the warning assembly 10 in the event of a hydraulic failure will now be described.

When the hydraulic line including conduit 17 is subjected to a failure, no hydraulic pressure is applied to the right chamber 41, and consequently, piston 28 is moved toward the right whereby the plunger 43 is moved upwardly against the biasing force of spring 46 by means of the cam portion 42 of piston 28, and the plunger 43 is brought into engagement with the metallic tube 47 thereby causing the lamp 48 to be lit. The rightward movement of piston 28 also causes the sealing ring 32 to be moved out of the small diameter portion 34 of sleeve 33, and consequently, the left chamber 35 may be in fluid communication with the annular chamber 37 and the inlet port 14 so as to thereby apply the pressurized fluid to the rear brake wheels 20 and 21 through means of passage 57. The reciprocable movement of valve piston 51 is thus rendered ineffective so as to compensate the brake force failure of the front wheel brakes 22 and 26. In other words, the hydraulic brake pressure is by-passed about valve 11 so as to actuate the rear wheel brakes directly from the master brake cylinder 13 in the event of a hydraulic failure within the conduit 17.

Similarly, when the hydraulic line including conduit 16 is subjected to a failure, no hydraulic pressure is able to be applied to the left chamber 35 and the annular chamber 37, and consequently the piston 25 is moved toward the left so as to thereby move the warning plunger 43 upwardly causing light lamp 48 to be illuminated.

Still further, when the proportioning valve assembly 11 is subjected to a failure, so as not to admit hydraulic pressure to port 18, such as for example, in the event that the valve piston 51 is maintained in contact with the valve seat 54, even when the hydraulic pressure is being increased at the master brake cylinder 13, no hydraulic pressure is able to be admitted into the annular chamber 37. Consequently, piston 28 is moved toward the left due to the hydraulic pressure within the right chamber 41 until the sealing ring 32 is brought into the left chamber 35. The hydraulic pressure admitted into the inlet port 14 is thus by-passed about valve assembly 11 so as to permit the direct fluid communication between the annular chamber 37 and the left chamber 35 and subsequently to rear brakes 20 and 21 through means of passage chambers 37 and 57.

The automatic returning operation of the piston 28 will now be explained. According to the present invention, the piston 28 of pressure difference warning assembly 10 is returned to the neutral position only as a result of the increased fluid pressure after the hydraulic failure has been repaired.

When the piston 28 has been moved toward the right, the hydraulic pressure applied to the right fluid chamber 41 urges the piston 28 to move back toward the left since the diameter $A_3$ is larger than the diameter $A_1$, and when the sleeve 38 abuts the inner shoulder 39 of housing 12, the leftward movement of the piston 28 is limited and further movement of the piston 28 is limited as diameter A4 is less than diameters A1 and $A_2$.

Similarly, when the piston 28 has been moved toward the left, the hydraulic pressure applied to the left chamber 35 and the annular chamber 37 urges the piston 28 to move back toward the right since the diameters $A_1$ and $A_2$ are larger than the diameter $A_4$, and after the shoulder of piston 28 abuts annular sleeve 38, further rightward movement of piston 28 is limited since the diameters $A_3$ and $A_4$ are greater than the diameters $A_1$ and $A_2$.

The piston 28 of warning assembly 10 is thus automatically returned to its neutral position solely as a result of the re-application of the fluid pressure.

Figure 2:
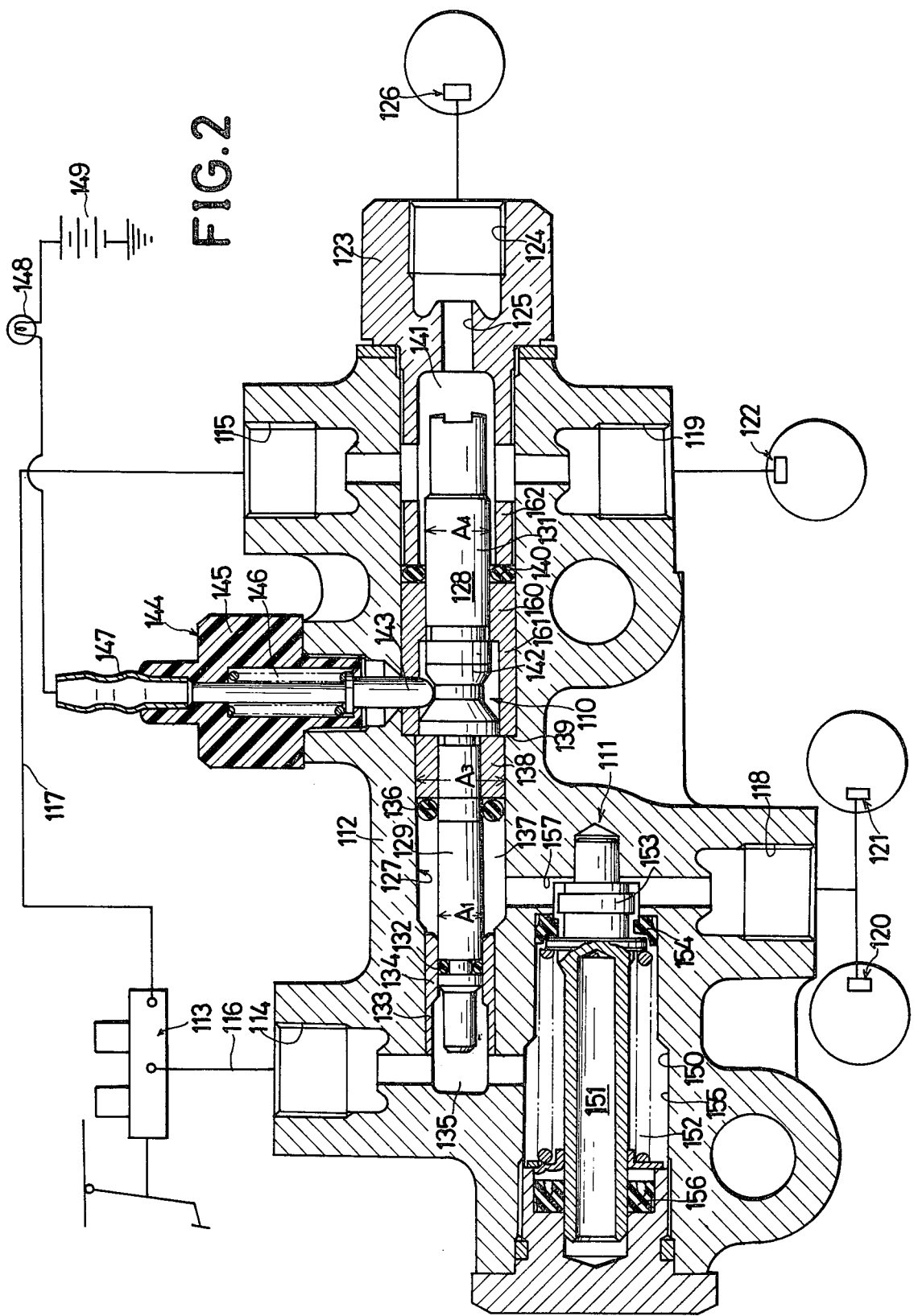
FIG. 2 is a view similar to that of FIG. 1, showing however another embodiment of the present invention.

Referring now to FIG. 2, a second embodiment of the present invention is shown, and it is to be noted that the reference characters of such embodiment are the same, except that they have been incorporated into a one-hundred series. In addition, it is also to be noted that the stepped piston 128 comprises a small diameter portion 129, having a diameter $A_1$, and a large diameter portion 131, having a diameter $A_4$. The annular sleeve 138 is slidably fitted upon and about the small diameter portion 129 while an annular sleeve 160 is securely mounted to the portion of housing 112 defining bore 127. The large diameter portion 131 of piston 128 is slidably disposed within sleeve 160 and the fixed sleeve 160 comprises an integral axial extension 161 which is adapted to abut slidable sleeve 138 so as to thereby limit the right movement thereof.

The plug 123 also comprises an axial extension 162 for assisting movement of the seal ring 140 toward the left until the same contacts the fixed sleeve 160 when the system is assembled.

It is again noted that the passage 157 is not only utilized as the proportioning valve passage, but also as the by-pass passage when the brake conduit 117 is subjected to a failure or the proportioning valve piston 151 remains seated upon the seal valve 154, and it will be appreciated that operation of this embodiment is substantially the same as that of FIG. 1, and consequently, a detailed summary of such operation is omitted herefrom.

Figure 3:
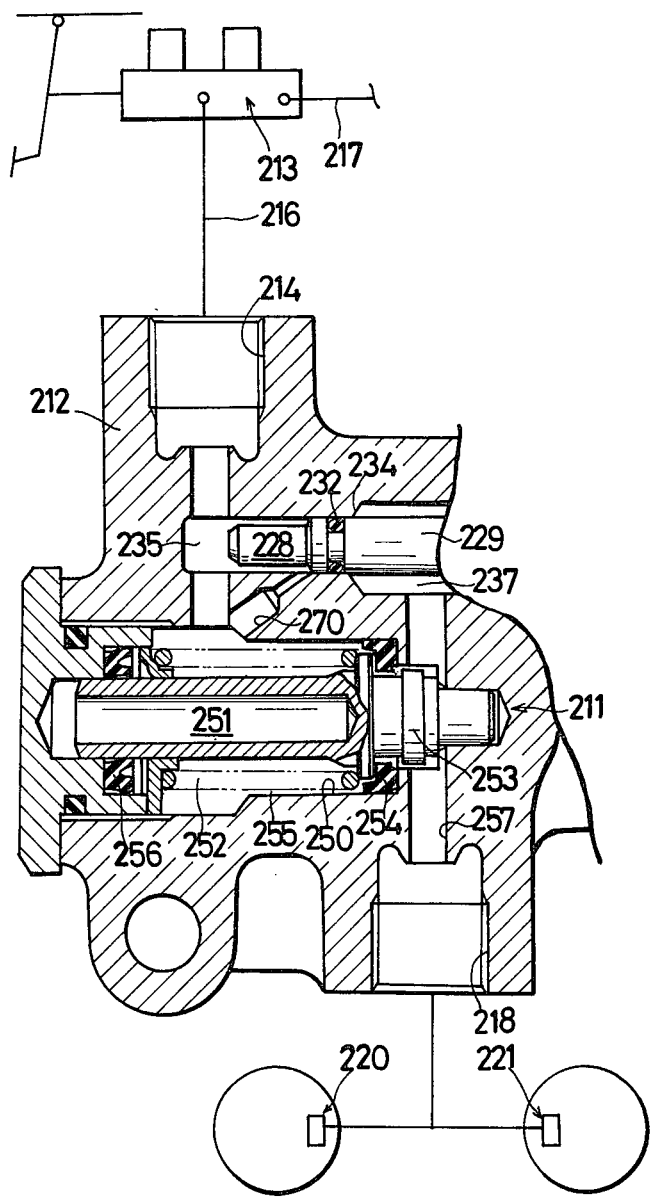
FIG. 3 is a view similar to that of FIG. 1, showing however still another embodiment of the present invention.

Turning now to FIG. 3, a third embodiment of the present invention is shown, and it is seen that the primary difference between the present embodiment and the previous embodiments resides in the fact that the housing 212 comprises an inner projecting portion 234 integrally formed with housing 212 in lieu of the fixed sleeve 33 or 133 and portion 34 or 134, and an inclined passage 270 fluidically interconnecting chambers 235 and 255, due to the fact that it is somewhat difficult to fix the sleeve 33 or 133 to the interior of the housing.

When the stepped piston 228 is moved toward the right as a result of a hydraulic failure within conduit 217, the hydraulic pressure within conduit 216 is able to be applied to the fluid chambers 235 and 237, by-pass passage 257, outlet port 218, and the rear wheel brakes 220 and 221 without necessarily passing through the proportioning valve assembly 211.

When the valve piston 251 is accidentally maintained seated upon the seal valve 254 so that no fluid pressure is able to be supplied to the fluid chamber 237, the stepped piston 228 is moved toward the left, and consequently, the hydraulic pressure of the master brake cylinder 213 is able to be transmitted to the fluid chamber 235, passage 270, fluid chamber 237, and then to the by-pass passage 257. It should be noted that the seal ring 232 is moved toward the left, beyond the outlet of the passage 270, when the piston 228 is moved toward the left, and consequently fluid is able to flow from passage 270 into chamber 237 as the diameter of piston portion 229 is slightly less than that of projection 234. As the remaining operation of this third embodiment is similar to that of the previous embodiments, further description of such operation is omitted herefrom.

Obviously, many modifications and variations of the present invention are possible in light of the above teachings. It is to be understood therefore that within the scope of the appended claims the present invention may be practiced otherwise than as specifically described herein.

What is claimed as new and desired to be secured by letters patent of the United States is:

1. A brake pressure difference and failure warning system operatively associated with a dual type master brake cylinder having two independent brake lines, one brake line being fluidically connected to rear wheel brakes while the other brake line is fluidically connected to front wheel brakes, comprising:
   a housing provided with an axial bore therein;
   a stepped piston slidably disposed within said bore and provided with a small diameter portion and a large diameter portion;
   a proportioning valve assembly disposed within said one of said brake lines;
   a first fluid chamber defined within said housing at one end of said small diameter portion of said stepped piston and disposed within said one brake line;
   a second fluid chamber defined within said housing and around said smaller diameter portion of said stepped piston and fluidically connected to said rear wheel brakes;

a passage provided within said housing and disposed within said one of said brake lines, said second fluid chamber being normally fluidically connected to said first fluid chamber through means of said proportioning valve assembly and said passage, said proportioning valve assembly thereby controlling the pressurization of said second chamber;

a third fluid chamber defined within said housing at the large diameter end portion of said stepped piston and disposed within said other brake line;

seal means provided upon said small diameter portion of said stepped piston, and interposed between said first and second fluid chambers for permitting fluid communication therebetween when said stepped piston is axially moved;

switch means operatively connected to said stepped piston;

said stepped piston having a predetermined configuration, and the stepped portions thereof having a predetermined area ratio with respect to each other, such that said stepped piston is axially movable, so as to actuate said switch means when each one of said first and third fluid chambers is subjected to a fluidic failure; and, when the proportioning valve is inoperatively seated on its valve seat with said first and said second fluid chambers not subjected to fluid failure such that the hydraulic pressure within said second fluid chamber is lower than the normal hydraulic pressure supplied to said second fluid chamber, fluid communication between said master cylinder and said rear wheel brakes is established through means of said first and second fluid chambers, and said passage; and means disposed within said axial bore for controlling the fluid communication between said first and second fluid chambers when said piston is axially moved in response to a fluidic failure.

2. The brake pressure difference warning system as set forth in claim 1, further comprising:
said means for controlling fluid communication is interposed between said first and second fluid chambers; and
said means for controlling fluid communication includes a radially inwardly projecting portion through which said small diameter portion of said stepped piston and said seal means slidably pass.

3. The brake pressure difference warning system as set forth in claim 2, wherein:
said means for controlling fluid communication and said projecting portion are integrally formed.

4. The brake pressure difference warning system of claim 2, wherein: the diameter of said small diameter portion of said piston is less than the diameter of said inwardly projecting portion.

5. The brake pressure difference warning system as set forth in claim 3, further comprising:
inclined fluid passage means, disposed within said housing portion defining said integrally formed radially inwardly projecting portion, for fluidically interconnecting said proportioning valve assembly and said first and second fluid chambers.

6. The brake pressure difference warning system of claim 3, wherein:
the diameter of said small diameter portion of said piston is less than the diameter of said inwardly projecting portion.

7. The brake pressure difference warning system as set forth in claim 1, further comprising:
a sleeve disposed about said large diameter portion of said stepped piston and movable therewith; and
a shoulder defined within said axial bore for limiting the axial movement of said sleeve and said piston.

8. The brake pressure difference warning system as set forth in claim 1, further comprising:
a second sleeve disposed about said small diameter portion of said stepped piston and movable therewith; and
a third sleeve fixedly secured within said axial bore for limiting the axial movement of said second sleeve and said piston.

9. The brake pressure difference warning system as set forth in claim 8, wherein:
said fixed sleeve is disposed about said large diameter portion of said stepped piston and includes an integrally formed axial extension for abutting said movable sleeve.

10. The brake pressure difference warning system as set forth in claim 1, wherein said switch means comprises:
a movable plunger operatively associated with said stepped piston;
an insulative member mounted upon said housing within which said plunger is disposed; and
a conductive member mounted upon said insulative member and normally being out of engagement with said plunger, yet engaged with said plunger when said stepped piston is axially moved in response to a pressure failure.

* * * * *